United States Patent
Liebl et al.

(10) Patent No.: US 10,507,526 B2
(45) Date of Patent: Dec. 17, 2019

(54) METHOD AND DEVICE FOR THE ADDITIVE MANUFACTURE OF AT LEAST ONE COMPONENT REGION OF A COMPONENT

(71) Applicant: MTU Aero Engines AG, Munich (DE)

(72) Inventors: Christian Liebl, Bockhorn (DE); Alexander Ladewig, Bad Wiessee (DE); Laura Buerger, Dachau (DE); Georg Schlick, Munich (DE); Steffen Schlothauer, Erdweg (DE); Karl-Heinz Dusel, Unterschleissheim (DE)

(73) Assignee: MTU Aero Engines AG, Munich (DE)

( * ) Notice: Subject to any disclaimer, the term of this patent is extended or adjusted under 35 U.S.C. 154(b) by 127 days.

(21) Appl. No.: 15/470,439

(22) Filed: Mar. 27, 2017

(65) Prior Publication Data

US 2017/0282246 A1 Oct. 5, 2017

(30) Foreign Application Priority Data

Apr. 1, 2016 (DE) .................. 10 2016 205 432

(51) Int. Cl.
*B29C 64/264* (2017.01)
*B22F 3/105* (2006.01)
(Continued)

(52) U.S. Cl.
CPC .......... *B22F 3/1055* (2013.01); *B23K 26/083* (2013.01); *B23K 26/342* (2015.10);
(Continued)

(58) Field of Classification Search
CPC ............ B22F 3/1055; B22F 2003/1056; B22F 2003/1057; B22F 2998/10; B22F 2998/00;
(Continued)

(56) References Cited

U.S. PATENT DOCUMENTS 8,598,523 B2   12/2013   Stecker et al.
2007/0175875 A1*  8/2007  Uckelmann ........ A61C 13/0013
                                                 219/121.85
(Continued)

FOREIGN PATENT DOCUMENTS

DE     102012221218 A1    5/2013
DE     102013201629 A1    7/2014
(Continued)

OTHER PUBLICATIONS

Kruth et al., On-line monitoring and process control in selective laser melting and laser cutting. Proceedings of the 5th Lane Conference, Laser Assisted Net Shape Engineering, vol. 1. Sep. 1, 2007. pp. 23 (Year: 2007).*

(Continued)

*Primary Examiner* — Jacob T Minskey
*Assistant Examiner* — Cedrick S Williams
(74) *Attorney, Agent, or Firm* — Barlow, Josephs & Holmes, Ltd.

(57) ABSTRACT

The invention relates to a method for the additive manufacture of at least one region of a component. Here, at least the following steps are carried out: a) layer-wise application of at least one powder-form component material onto a component platform in the region of a build-up and joining zone; b) layer-wise and local solidifying of the component material by selective exposure of the component material by at least one high-energy beam in the region of the build-up and joining zone, with the formation of a component layer; c) layer- wise lowering of the component platform by a predefined layer thickness; and d) repeating steps a) to c) until the component region or the component has been completely fabricated.

11 Claims, 3 Drawing Sheets

(51) Int. Cl.
| | |
|---|---|
| B33Y 10/00 | (2015.01) |
| B33Y 30/00 | (2015.01) |
| B33Y 40/00 | (2015.01) |
| B33Y 50/02 | (2015.01) |
| B33Y 80/00 | (2015.01) |
| B23K 26/342 | (2014.01) |
| B23K 26/70 | (2014.01) |
| B23K 26/08 | (2014.01) |
| B23K 31/12 | (2006.01) |
| B23K 101/00 | (2006.01) |
| B22F 5/00 | (2006.01) |

(52) U.S. Cl.
CPC .......... *B23K 26/702* (2015.10); *B23K 31/125* (2013.01); *B33Y 10/00* (2014.12); *B33Y 30/00* (2014.12); *B33Y 40/00* (2014.12); *B33Y 50/02* (2014.12); *B33Y 80/00* (2014.12); *B22F 5/009* (2013.01); *B22F 2003/1056* (2013.01); *B22F 2003/1057* (2013.01); *B22F 2998/10* (2013.01); *B22F 2999/00* (2013.01); *B23K 2101/001* (2018.08); *Y02P 10/295* (2015.11)

(58) Field of Classification Search
CPC ...... B23K 31/125; B33Y 50/02; B33Y 80/00; B33Y 40/00; B33Y 10/00; B29C 64/20
See application file for complete search history.

(56) References Cited

U.S. PATENT DOCUMENTS

| | | | |
|---|---|---|---|
| 2009/0176007 A1* | 7/2009 | Uckelmann | A61C 13/0018 427/8 |
| 2015/0268099 A1 | 9/2015 | Craig et al. | |
| 2016/0074937 A1* | 3/2016 | Nassar | B22F 3/1055 419/53 |
| 2017/0001379 A1* | 1/2017 | Long | B33Y 50/02 |
| 2017/0282455 A1* | 10/2017 | DeFelice | B33Y 10/00 |

FOREIGN PATENT DOCUMENTS

| | | |
|---|---|---|
| DE | 102014201818 A1 | 8/2015 |
| EP | 2498935 B1 | 9/2012 |
| WO | 2011123195 A1 | 10/2011 |
| WO | 2014074947 A9 | 5/2014 |

OTHER PUBLICATIONS

Qin, Qun and Chen, Guang Xia, "Effects of parameters on surface roughness of metal parts by selective laser melting," Research in Materials and Manufacturing Technologies (2013), vol. 834-836, pp. 872-875, 2052.

Price, Steven et al., "On Process Temperature in Powder-Bed Electron Beam Additive Manufacturing: Process Parameter Effects," Transactions of the ASME, Journal of Manufacturing Science and Engineering, 2014.

Tapia, Gustavo and Elwany, Alaa, "A Review on Process Monitoring and Control in Metal-Based Additive Manufacturing," Transactions of the ASME, Journal of Manufacturing Science and Engineering, 2014.

Manfredi, D. et al., "Additive Manufacturing of Al Alloys and Aluminium Matrix Composites (AMCs)," Chapter 1 from Book Light Metal Alloys Applications, INTECH, Jun. 11, 2014.

Simonelli, M. et al., "Aspects of the Process and Material Relationships in the Selective Laser Melting of Aluminium Alloys," 144th Annual Meeting & Exhibition, Orlando, FL; Mar. 15-19, 2015.

Wang, Di et al., "Research on the fabricating quality optimization of the overhanging surface in SLM process", Int J Adv Manuf Technol, vol. 65, No. 9-12, pp. 1471-1484, 20 refs., 2013.

* cited by examiner

METHOD AND DEVICE FOR THE ADDITIVE MANUFACTURE OF AT LEAST ONE COMPONENT REGION OF A COMPONENT

BACKGROUND OF THE INVENTION

The invention relates to a method as well as a device for the additive manufacture of at least one region of a component.

A multiple number of methods and devices are known for the manufacture of individual component regions or complete components. In particular, additive or generative fabrication methods (so-called rapid manufacturing or rapid prototyping methods) are known, in which the component, which, for example, may involve a component of a turbomachine or of an aircraft engine is built up layer by layer or layer-wise. Predominantly metal components can be manufactured, for example, by laser-beam or electron-beam melting or sintering methods. In this case, at least one powder-form component material is first applied layer-wise onto a component platform in the region of a build-up and joining zone of the device. Subsequently, the component material is locally solidified layer-wise by introducing energy into the component material in the region of the build-up and joining zone by means of at least one high-energy beam, for example, an electron-beam or laser beam, whereby the component material is melted and/or sintered. The high-energy beam is controlled here depending on layer information for the respective component layer being manufactured. The layer information is usually produced from a 3D-CAD body of the component and subdivided into individual component layers. After solidifying, the component platform is lowered layer-wise by a pre-defined layer thickness. After this, the named steps are repeated up to the final fabrication of the desired component region or of the entire component.

The resulting material properties, however, greatly depend on the exposure parameters selected for the high-energy beam and the geometry of the component being manufactured. Therefore, in practice, different surface qualities frequently result for a component or a component region that is additively manufactured. Additionally, the angle of incidence of the high-energy beam is implicated, so that component regions that are at a distance relatively far from a radiation source and make necessary a large deflection of the high-energy beam frequently have a component quality that is different from component regions that lie directly underneath the radiation source.

SUMMARY OF THE INVENTION

The object of the present invention is to create a method and a device that make possible the additive manufacture of at least one component region with more homogeneous material properties even in the case of different component geometries.

The objects are achieved according to the invention by a method as well as by a device of the present invention. Advantageous embodiments with appropriate enhancements of the invention are discussed in detail below, whereby advantageous embodiments of the method are to be viewed as advantageous embodiments of the device and vice versa.

A first aspect of the invention relates to a method for the additive manufacture of at least one region of a component, in which at least the following steps are carried out: a) layer-wise application of at least one powder-form component material onto a component platform in the region of a build-up and joining zone; b) layer-wise and local hardening of the component material by selective exposure of the component material by means of at least one high-energy beam in the region of the build-up and joining zone, with the formation of a component layer; c) layer-wise lowering of the component platform by a pre-defined layer thickness; and d) repeating steps a) to c) until the component region or the component has been completely fabricated. More homogeneous material properties that are at least largely independent of the component geometry are achieved thereby according to the invention, in that during at least one step b), at least one exposure parameter of the high-energy beam from the group: power, velocity, and focal position is adjusted as a function of at least one construction parameter from the group: component thickness, hatch distance to an adjacent exposure trace, angle of incidence of the high-energy beam relative to the surface of the component layer, angle of deflection of the high-energy beam with respect to a vertical axis of the component layer, overhang angle of the component layer, layer thickness of the component layer, and distance from a complete volume element of the component layer. In other words, it is provided according to the invention that during the build-up of at least one component layer, 1, 2 or 3 exposure parameters from the group: power, velocity, and focal position, of the high-energy beam is or are adjusted via a function that in turn takes into consideration 1, 2, 3, 4, 5, 6 or 7 construction parameters from the group: component thickness, hatch distance to an adjacent exposure trace, angle of incidence of the high-energy beam relative to the surface of the component layer, angle of deflection of the high-energy beam with respect to a vertical axis of the component layer, overhang angle of the component layer, layer thickness of the component layer, and distance from a complete volume element of the component layer. Preferably, all three exposure parameters are determined dependent on or independent of one another as a function of all seven construction parameters. Particularly good, homogeneous material properties optimally adapted to the respective geometry of the component layer are assured thereby for the component layer in question. In particular, a break-through of the high-energy beam, on the one hand, and an insufficient solidifying of the powder-form component material, on the other hand, are prevented even in surface and edge regions as well as in tapering regions of the component.

In an advantageous embodiment of the invention, it is provided that a laser sintering and/or laser melting method is/are used as an additive manufacturing method, and/or a laser beam is used as a high-energy beam. Components or component regions, whose mechanical properties correspond, at least essentially, to those of the component material, can be manufactured thereby. $CO_2$ lasers, Nd:YAG lasers, Yb fiber lasers, diode lasers, or the like can be provided for generation of the high-energy beam or the laser beam. Likewise, it may be provided that two or more high-energy beams or laser beams are used, the exposure parameters of which are also preferably determined as a function of the above-named construction parameters.

Additional advantages result by at least reducing the exposure parameter, power, of the high-energy beam in comparison to the power in an inskin region, if the construction parameter, overhang angle of the component layer, in the exposed region corresponds to a downskin region, and/or in that at least the exposure parameter, power, of the high-energy beam is increased in comparison to the power in an inskin region, if the construction parameter, overhang angle of the component layer, corresponds to an upskin region in the exposed region. The power of the high-energy beam can be individually controlled and/or regulated therewith for all possible overhang angles. Understood as a downskin region in this case is an overhanging component region that has no further component region underneath it, whereas an upskin region is correspondingly a component region that has no further component region above it. Component regions that have component regions above and below are called inskin regions. In the downskin region or in the overhang structures of the component, by reducing the power of the high-energy beam as a function of the concrete overhang angle in comparison to the power in an inskin region, a break-through of the high-energy beam into the loose powder bed and thus the associated formation of defect sites and irregular surface structures are reliably avoided in a manner specific to the component. Likewise, an energy input that is too high in the case of tapering overhang geometries will be avoided, since if it were not, the more rapid return time of the high-energy beam in these regions would lead to an excessive energy input and to corresponding overheating. Due to the relative increase in the power of the high-energy beam in upskin regions, on the other hand, the circumstance is taken into account that a portion of the energy of the high-energy beam is absorbed by inskin regions under the upskin region. Correspondingly, due to a relative increase in the power as a function of the overhang angle, it is assured that the powder material is reliably solidified in the upskin region.

Further advantages result by determining in advance the at least one exposure parameter of the high-energy beam from the group: power, velocity, and focal position, prior to the manufacture of the component layer in step b) as a function of at least one construction parameter from the group: component thickness, hatch distance to an adjacent exposure trace, angle of incidence of the high-energy beam relative to the surface of the component layer, angle of deflection of the high-energy beam with respect to a vertical axis of the component layer, overhang angle of the component layer, layer thickness of the component layer, and distance from a complete volume element of the component layer, and is provided as a data set for the control and/or regulation of the high-energy beam. In other words, it is provided that 1, 2 or 3 exposure parameters are produced in advance of the actual manufacturing step and are provided and used as the data set for the control and/or regulation of the high-energy beam. The determination of the one or more exposure parameters can be produced basically not only on the basis of the one or more above-named construction parameters, but additionally can be produced on the basis of values from experience, test results, simulations, statistical analyses, or any combinations of these.

In another advantageous embodiment of the invention, it is provided that the at least one exposure parameter of the high-energy beam is determined in advance in the scope of determining a hatch geometry of the component layer. The one or more exposure parameters from the group: power, velocity, and focal position can be determined individually and in any combination, together with the determination of the hatch geometry (trace geometry) from 3D-CAD component data for the component or component region. The specific properties of the component region can be particularly well considered thereby, since, in addition to the up to 7 named construction parameters, the respective hatch variants or the respective fill type of the component layer in question can also enter into the determination.

In another advantageous embodiment of the invention, it is provided that during at least one step b) and/or after at least one step b), at least one measurement parameter characterizing a quality of the manufactured component layer is determined, and the at least one exposure parameter of the high-energy beam from the group: power, velocity, and focal position is determined and/or modified as a function of the measurement parameter and of the at least one construction parameter. During and/or after the manufacture of a component layer, the quality of the manufactured component layer is monitored or controlled thereby, for which reason a corresponding measurement parameter is determined. This measurement parameter is then used in addition to the up to 7 construction parameters for the purpose of determining the one or more exposure parameters. Alternatively or additionally, one or more exposure parameters may already be present as pre-determined parameters and are provided, for example, as a data set. In this case, the measurement parameter is employed for the purpose of modifying the one or more already existing exposure parameters. This makes possible a regulation of the manufacturing step and thus a reliable equilibration of fluctuations in the manufacturing process.

In another advantageous embodiment of the invention, it is provided that a radiation source, by means of which the high-energy beam is generated, is not moved, at least during one step b). In other words, the radiation source remains stationary relative to the component layer during the manufacture of one, several, or all component layers, so that only the high-energy beam is moved relative to the component layer, in order to expose the powder-form component material. This facilitates the determination of the one or more exposure parameters.

A second aspect of the invention relates to a device for the additive manufacture of at least one region of a component, in particular a component of a turbine or of a compressor, comprising at least one powder supply for application of at least one powder layer of a component material onto a build-up and joining zone of a component platform that can be lowered, as well as at least one radiation source for generating at least one high-energy beam, by means of which the powder layer can be solidified locally into a component layer in the region of the build-up and joining zone Therefore, more homogeneous material properties are also made possible according to the invention in the case of different component geometries, due to the fact that the device comprises a memory unit having a data set provided in a memory, whereby the data set comprises at least one construction parameter from the group: component thickness, hatch distance to an adjacent exposure trace, angle of incidence of the high-energy beam relative to the surface of the component layer, angle of deflection of the high-energy beam with respect to a vertical axis of the component layer, overhang angle of the component layer, layer thickness of the component layer, and distance from a complete volume element of the component layer. In addition, the device comprises a control device for controlling and/or regulating the radiation source, whereby the control device is designed for the purpose of determining in advance at least one exposure parameter of the high-energy beam from the group: power, velocity and focal position, as a function of the data set. With the help of the memory unit and the control device, 1, 2 or 3 exposure parameters from the group: power, velocity, and focal position, of the high-energy beam thus can be determined for the build-up of at least one component layer, taking into consideration 1, 2, 3, 4, 5, 6 or 7 construction parameters from the group: component thickness, hatch distance to an adjacent exposure trace, angle of incidence of the high-energy beam relative to the surface of the component layer, angle of deflection of the high-energy beam with respect to a vertical axis of the component layer, overhang angle of the component layer, layer thickness of the component layer, and distance from a complete volume element of the component layer. Preferably, the device is designed to determine all three exposure parameters, dependent on or independent of one another, as a function of all seven construction parameters. Particularly good, homogeneous material properties that are optimally adapted to the respective geometry of the component layer can be assured thereby for one, several, or all component layers that are manufactured with the help of the device. In particular, a breakthrough of the high-energy beam, on the one hand, and an insufficient solidifying of the powder-form component material, on the other hand, can be prevented even in surface and edge regions as well as in tapering regions of the component.

Here, it has been shown to be advantageous when the device for conducting a method is designed according to the first aspect of the invention. Features resulting therefrom and the advantages thereof can be derived from the descriptions of the first aspect of the invention, wherein advantageous embodiments of the first aspect of the invention are to be viewed basically as advantageous embodiments of the second aspect of the invention, and vice versa.

Further advantages result in that the device comprises a measuring instrument, by which at least one measurement parameter characterizing a quality of the manufactured component layer can be determined. For example, an optical tomography device and/or a device for melt bath analysis can be used as a measuring instrument.

In this case, in addition, it has been shown to be advantageous if the control device is coupled to the measuring instrument for exchanging data, and is designed to determine in advance the at least one exposure parameter of the high-energy beam from the group: power, velocity, and focal position, as a function of the data set and of the measurement parameter, and/or to at least modify an already pre-determined exposure parameter. In other words, the device is designed for the purpose of conducting a monitoring or control of the quality of the manufactured component layer during and/or after the manufacture of a component layer, for which reason the measurement parameter is determined. This measurement parameter is then transmitted to the control device, which uses the measurement parameter in addition to the up to 7 construction parameters for the purpose of determining the one or more exposure parameters and to control the radiation source accordingly. Alternatively or additionally, one or more exposure parameters that are already pre-determined can be provided as a data set in the memory unit. In this case, the control device uses the at least one measurement parameter for the purpose of modifying the one or more already existing exposure parameters, in order to adapt the control of the high-energy beam to the concrete particular features.

BRIEF DESCRIPTION OF THE DRAWING FIGURES

Additional features of the invention result from the claims, the figures, and the description of the figures. The features and combinations of features named in the preceding description, as well as the features and combinations of features named below in the description of the figures and/or in the figures alone can be used not only in the combination indicated in each case, but also in other combinations, without departing from the scope of the invention. Thus, embodiments of the invention that are not explicitly shown and explained in the figures, but proceed from the explained embodiments and can be produced by separate combination of features, are also to be viewed as comprised and disclosed. Embodiments and combination of features that thus do not have all features of an originally formulated independent claim are also to be viewed as disclosed. Herein:

Figure 1:
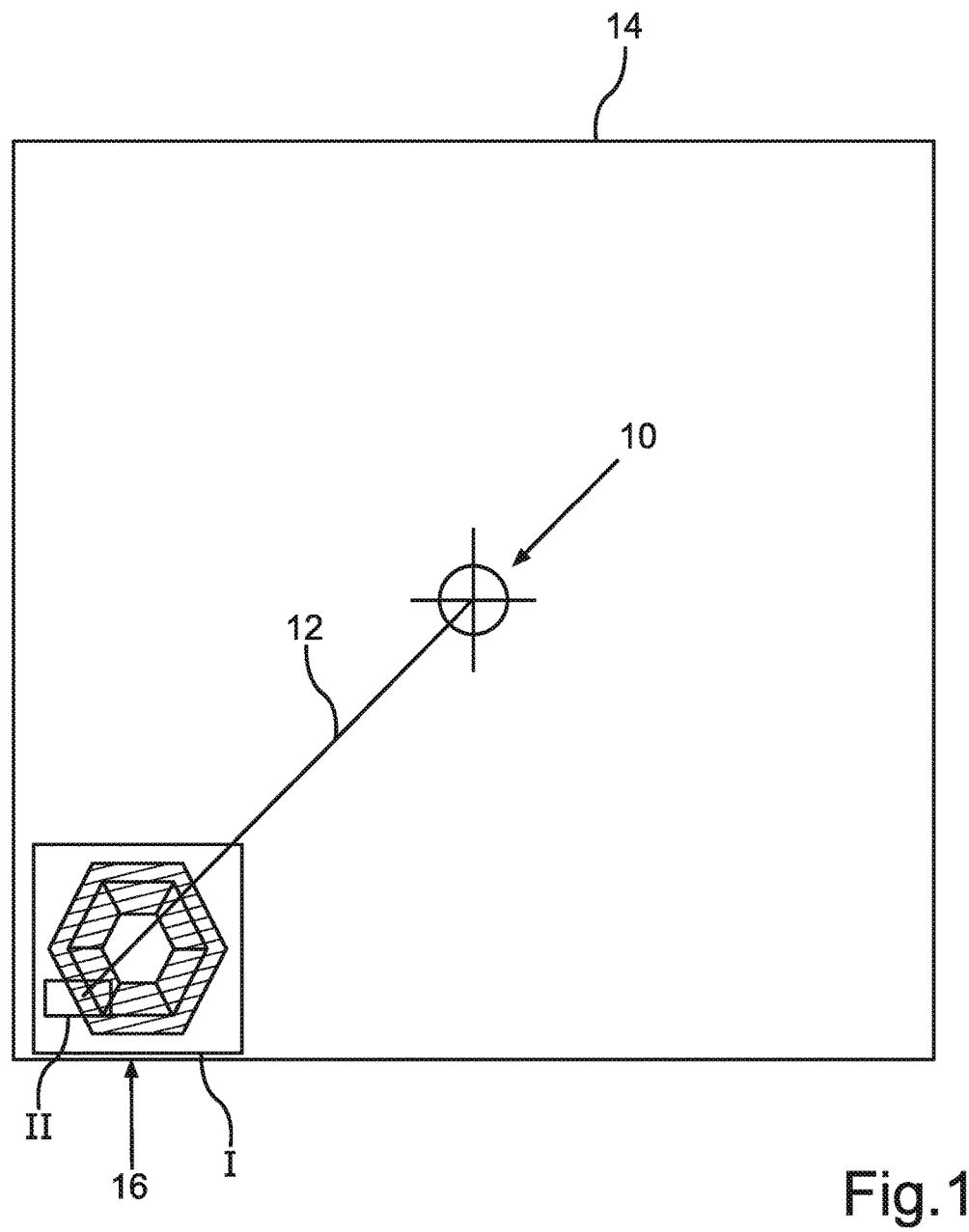
FIG. 1 shows a schematic top view of a radiation source, by means of which a high-energy beam is generated for the local solidification of a component layer.

FIG. 1 shows a schematic top view of a radiation source 10 of a device for the additive manufacture of at least one region of a component, for example, a component of a turbomachine. The radiation source 10 is presently designed as a laser and generates a laser beam 12 for the layer-wise local solidifying of a powder-form component material that is applied in a build-up and joining zone 14 on a component platform (not shown) that can be lowered. The radiation source 10 here in the present embodiment example is mounted fixed in place relative to the build-up and joining zone 14 in the device, so that the laser beam 12 is deflected by an appropriate optics unit in a way known in and of itself onto the desired regions of the build-up and joining zone 14. In this case, the exposure parameters: power P, velocity v, and focal position F, of the laser beam 12 are adjusted as a function of several construction parameters from the group: component thickness $b_{teil}$, hatch distance h to an adjacent exposure or scan trace 24 (FIG. 3), angle of incidence $\alpha$ of the high-energy beam or laser beam 12 relative to the surface of a respective component layer 15, angle of deflection $\beta$ of the high-energy beam or laser beam 12 with respect to a vertical axis z of the component layer, overhang angle $\gamma$ of the component layer, layer thickness n of the component layer, and distance w from a complete volume element of the component layer, in order to assure a high material quality that is as homogeneous as possible.

Figure 2:
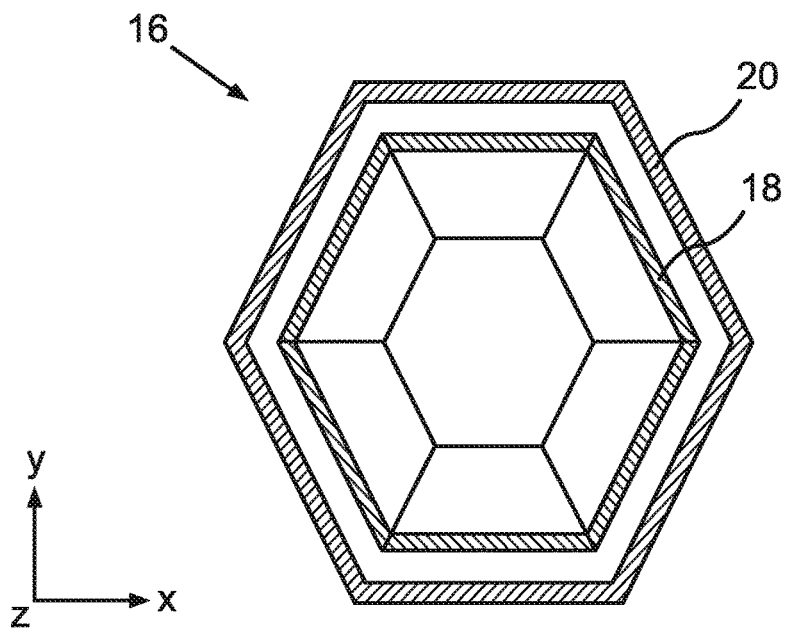
FIG. 2 shows a schematic top view of the detail I shown in FIG. 1.
Figure 3:
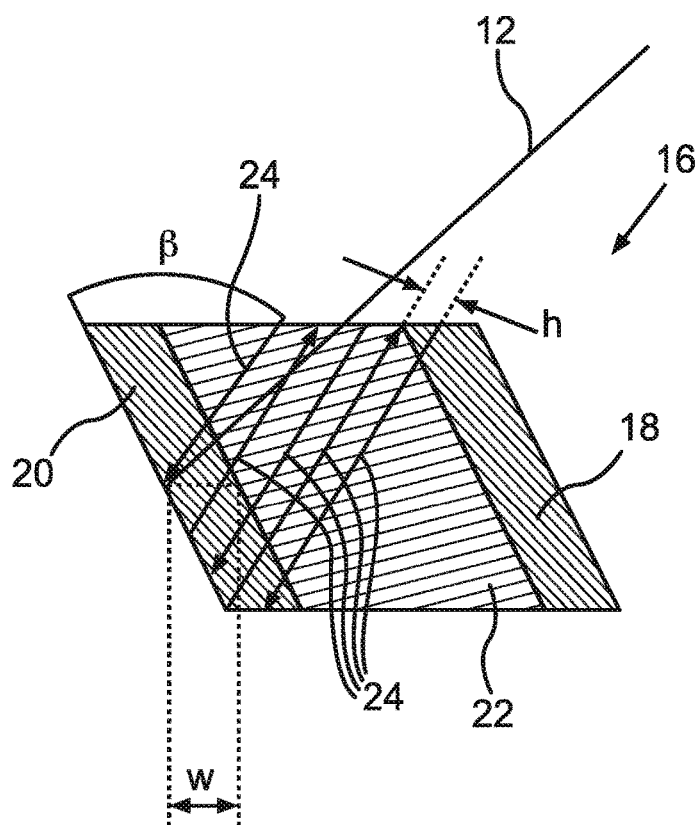
FIG. 3 shows a schematic top view of the detail II shown in FIG. 1.
Figure 4:
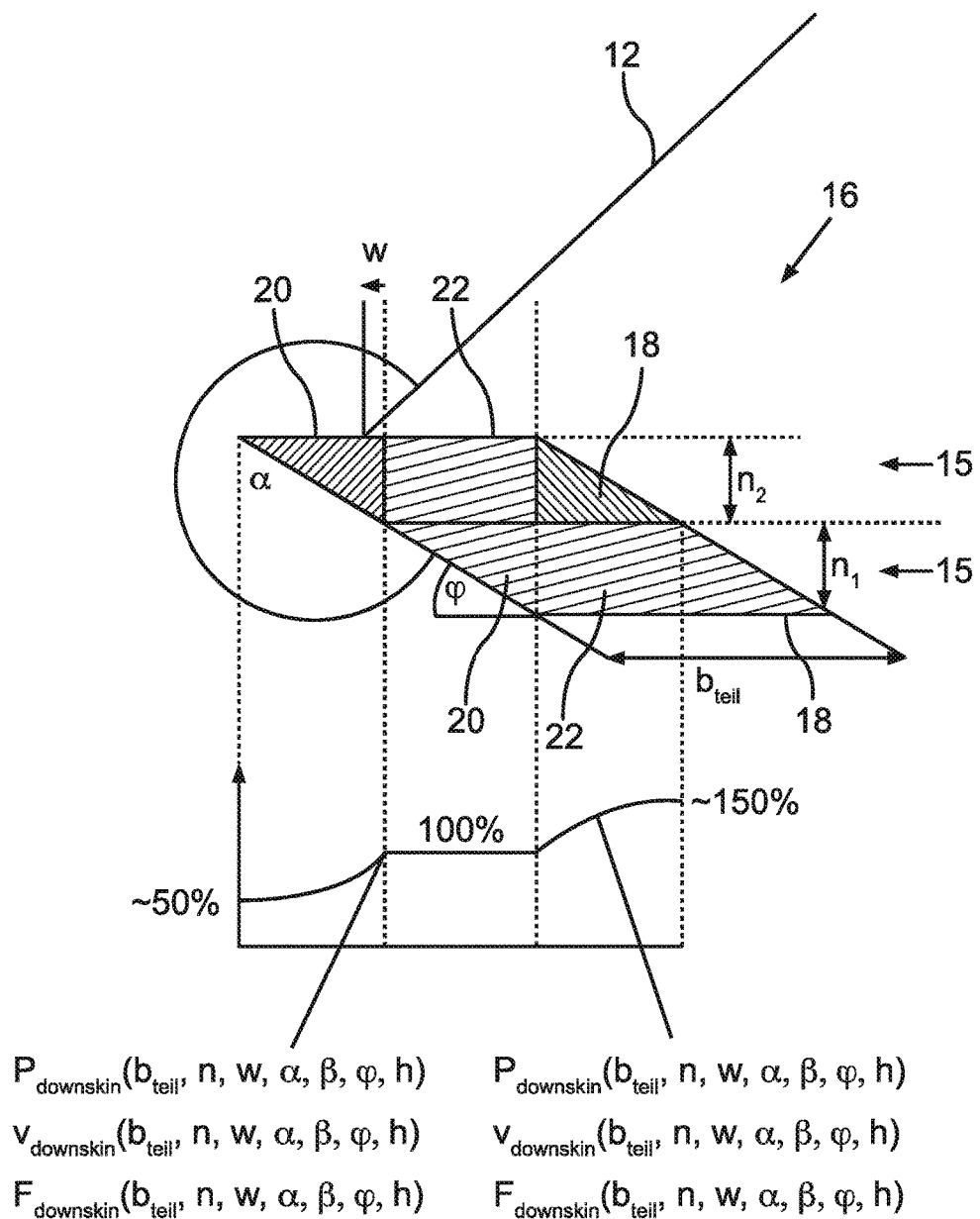
FIG. 4 shows a schematic lateral sectional view of the detail II shown in FIG. 1.

FIG. 2 shows, for this purpose, a schematic top view of the component region 16 according to the detail I shown in FIG. 1 and will be explained below along with FIG. 3 and FIG. 4, wherein FIG. 3 shows a schematic top view of the detail II shown in FIG. 1, and FIG. 4 shows a schematic lateral sectional view of the detail II shown in FIG. 1. It is recognized that the additively manufactured component region 16, of which, in the present example, only two component layers 15 with the respective layer thicknesses $n_1$ and $n_2$ are shown, has an upskin region 18, a downskin region 20, and an inskin region 22. As can be recognized in particular in FIG. 4, the exposure parameters: power P, velocity v, and focal position F, of the high-energy beam are determined in each case as a function of the construction parameters $b_{teil}$, n, w, $\alpha$, $\beta$, $\varphi$ and h along the scanning vectors 24 indicated by arrows in FIG. 3:

$P(b_{teil}, n, w, \alpha, \beta, \varphi, h)$
$v(b_{teil}, n, w, \alpha, \beta, \varphi, h)$
$F(b_{teil}, n, w, \alpha, \beta, \varphi, h)$

DESCRIPTION OF THE INVENTION

As can be recognized in FIG. 4, the power P is reduced in the downskin region 20 down to approximately 50% of the power P used in the inskin or intermediate region 22, so that the power P of the high-energy beam 12 has the smallest value at the thinnest site of the downskin region 20 or for the smallest angle of incidence α. In this case, the function of reducing is basically not limited to the nonlinear course shown, but can also run linearly or assume other functional courses. In the inskin region 22, the power P is kept uniformly at a relative 100%. In the upskin region 18, the power P is increased non-linearly up to 150% with respect to the power P in the inskin region 22, so that the power P of the high-energy beam 12 is highest at the thickest site of the upskin region 18 in consideration of the component layer 15 lying thereunder. Other functional courses are also basically conceivable even here.

By way of this targeted parametrization as a function of overhang angle γ, construction parameters specific to the component geometry: $b_{teil}$, n, w, φ and h, and laser beam angles α, β, the quality of the component region 16 in general and the surface quality thereof in particular can be essentially improved and made uniform. For this purpose, for example, in the data processing, another parameter is delivered to a control device, which represents the component geometry (overhang angle (γ), layer thickness (n) etc.), as well as the laser beam angle (α). With the help of these values, during the build-up, the power P, the velocity v, and the focus F, of the high-energy beam 12 are determined along the scan vectors 24 via the above-mentioned functions.

The adjustment of the power P, among other things, is thus dependent on the geometry or the overhang of the component region 16 and can be produced in advance in the calculation of the hatch geometry. For example, the calculation can be oriented to values from experience (testing, simulation, statistics, etc.). It is likewise possible that an online regulation, thus a determination or modification, takes place during the manufacturing step of the component region 16 in question. For this, at least one measurement value characterizing the component quality is determined by a measuring instrument (optical tomography, melt bath analysis, etc.) and can then be used subsequently for determining or modifying the exposure parameters. This permits an equalizing of fluctuations in the manufacturing process in the sense of an online regulation.

What is claimed is:

1. A method for the additive manufacture of at least one region of a component, comprising the following steps:
    a) layer-wise application of at least one powder-form component material onto a component platform in the region of a build-up and joining zone;
    b) layer-wise and local solidifying of the component material by selective exposure of the component material by at least one high-energy beam in the region of the build-up and joining zone, with the formation of a component layer;
    c) layer-wise lowering of the component platform by a pre-defined layer thickness; and
    d) repeating steps a) to c) until the component region or the component has been completely fabricated;
    wherein during at least one step b), at least one exposure parameter of the high-energy beam from the group: power, velocity, and focal position, is adjusted as a function of at least one construction parameter from the group: component thickness, hatch distance to an adjacent exposure trace, angle of incidence of the high-energy beam relative to the surface of the component layer, angle of deflection of the high-energy beam with respect to a vertical axis of the component layer, overhang angle of the component layer, layer thickness of the component layer, and distance from a complete volume element of the component layer, and
    wherein during at least one step b), the method further comprises determining, with a controller, at least the overhang angle of the component layer, and adjusting
        at least the exposure parameter, power, of the high-energy beam to reduce the power, when compared to the power in an inskin region, if the construction parameter, overhang angle, of the component layer in the exposed region corresponds to a downskin region, and
        at least the exposure parameter, power, of the high-energy beam to increase the power, when compared to the power in an inskin region, if the construction parameter, overhang angle, of the component layer in the exposed region corresponds to an upskin region.

2. The method according to claim 1, wherein
a laser sintering method and/or a laser melting method is used as the additive manufacturing method, and/or a laser beam is used as the high-energy beam.

3. The method according to claim 1, wherein
the at least one exposure parameter of the high-energy beam from the group: power, velocity, and focal position, is determined in advance, prior to the manufacture of the component layer in step b) as a function of at least one construction parameter from the group: component thickness, hatch distance to an adjacent exposure trace, angle of incidence of the high-energy beam relative to the surface of the component layer, angle of deflection of the high-energy beam with respect to a vertical axis of the component layer, overhang angle of the component layer, layer thickness of the component layer, and distance from a complete volume element of the component layer, and is provided as a data set for control and/or regulation of the high-energy beam.

4. The method according to claim 3, wherein
the at least one exposure parameter of the high-energy beam is pre-determined in the scope of a determination of a hatch geometry of the component layer.

5. The method according to claim 1, wherein
during at least one step b) and/or after at least one step b), at least one measurement parameter characterizing a quality of the manufactured component layer is determined, and the at least one exposure parameter of the high-energy beam from the group: power, velocity and focal position, is determined and/or modified as a function of the measurement parameter and of the at least one construction parameter.

6. The method according to claim 1, wherein
a radiation source, which generates the high-energy beam, is not moved, at least during one step b).

7. The method according to claim 1, wherein during at least one step b), each of the exposure parameters is determined as a function of at least a plurality of the construction parameters from the group: component thickness, hatch distance to an adjacent exposure trace, angle of incidence of the high-energy beam relative to the surface of the component layer, angle of deflection of the high-energy beam with respect to a vertical axis of the component layer, overhang angle of the component layer, layer thickness of the component layer, and distance from a complete volume element of the component layer.

8. A device for the additive manufacture of at least one region of a component of a turbine or of a compressor, comprising:

at least one powder supply for applying at least one powder layer from a component material onto a build-up and joining zone of a component platform that can be lowered; and at least one radiation source for generating at least one high-energy beam, by which the powder layer can be solidified locally into a component layer in the region of the build-up and joining zone;

a control device for controlling and/or regulating the radiation source, wherein the control device is designed for the purpose of pre-determining at least one exposure parameter of the high-energy beam from the group: power, velocity, and focal position, as a function of a data set, the data set comprises at least one construction parameter from the group: component thickness, hatch distance to an adjacent exposure trace, angle of incidence of the high-energy beam relative to the surface of the component layer, angle of deflection of the high-energy beam with respect to a vertical axis of the component layer, overhang angle of the component layer, layer thickness of the component layer, and distance from a complete volume element of the component layer, wherein the control device is configured and arranged to determine at least the overhang angle of the component layer, and configured and arranged to adjust at least the exposure parameter, power, of the high-energy beam to reduce the power, when compared to the power in an inskin region, if the construction parameter, overhang angle, of the component layer in the exposed region corresponds to a downskin region, and at least the exposure parameter, power, of the high-energy beam to increase the power, when compared to the power in an inskin region, if the construction parameter, overhang angle, of the component layer in the exposed region corresponds to an upskin region.

9. The device according to claim 8 wherein further comprising a measuring instrument, by which at least one measurement parameter characterizing a quality of the manufactured component layer can be determined.

10. The device according to claim 9, wherein the control device is coupled to the measuring instrument for exchanging data, and is designed to determine in advance the at least one exposure parameter of the high-energy beam from the group: power, velocity, and focal position, as a function of the data set and of the measurement parameter, and/or to modify at least one already pre-determined exposure parameter.

11. The device of claim 8 wherein the controller is configured and arranged to determine each of the exposure parameters as a function of at least a plurality of the construction parameters from the group: component thickness, hatch distance to an adjacent exposure trace, angle of incidence of the high-energy beam relative to the surface of the component layer, angle of deflection of the high-energy beam with respect to a vertical axis of the component layer, overhang angle of the component layer, layer thickness of the component layer, and distance from a complete volume element of the component layer.

* * * * *